United States Patent [19]

Raven et al.

[11] 4,393,396
[45] Jul. 12, 1983

[54] VIDEO SIGNAL PROCESSING CIRCUIT FOR NOISE REDUCTION

[75] Inventors: Johannes G. Raven, Eindhoven; Marinus C. W. Van Buul, Breda, both of Netherlands

[73] Assignee: U.S. Philips Corporation, New York, N.Y.

[21] Appl. No.: 288,250

[22] Filed: Jul. 27, 1981

[30] Foreign Application Priority Data

Aug. 20, 1980 [NL] Netherlands .......................... 8004696
Jan. 27, 1981 [NL] Netherlands .......................... 8100361

[51] Int. Cl.³ ........................ H04N 5/21; H04N 9/535
[52] U.S. Cl. ....................................... 358/36; 358/167
[58] Field of Search .................... 358/36, 37, 166, 167

[56] References Cited

U.S. PATENT DOCUMENTS 4,058,836 11/1977 Drewery ............................. 358/167
4,223,340 9/1980 Bingham et al. ................. 358/36 X
4,291,333 9/1981 Warnock et al. ..................... 358/36

OTHER PUBLICATIONS

SMPTE Journal, vol. 87, No. 3, pp. 129–133, Mar. 1978.

Primary Examiner—Robert L. Richardson
Attorney, Agent, or Firm—T. A. Briody; William J. Streeter; Edward W. Goodman

[57] ABSTRACT

In a noise suppression circuit for a video signal the number of elements required can be reduced when a separation circuit (3) for a high-frequency and a low-frequency component is used and the noise suppression is effected in the low-frequency component by means of a comb filter (19) which, in order to realize a still further savings in components, may comprise a delay circuit having a delay (103, 105, 107) which is switchable between a field period plus half a line period and a field period minus half a line period. The noise suppression circuit is therefore particularly suitable for use in television receivers.

5 Claims, 4 Drawing Figures

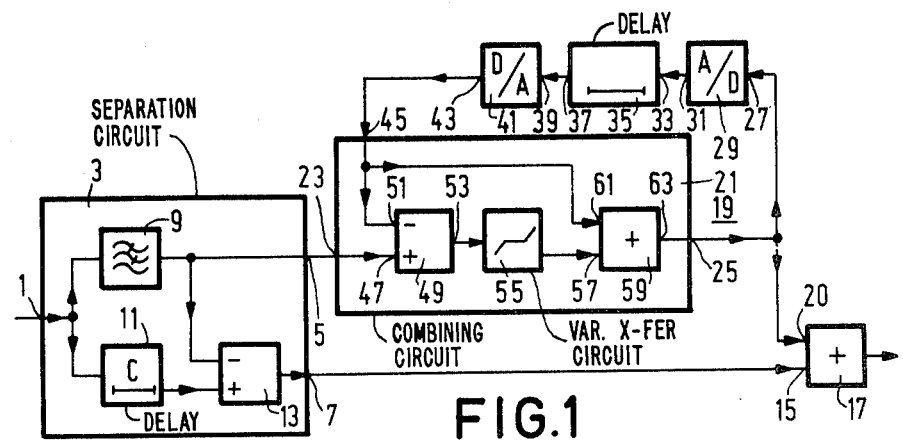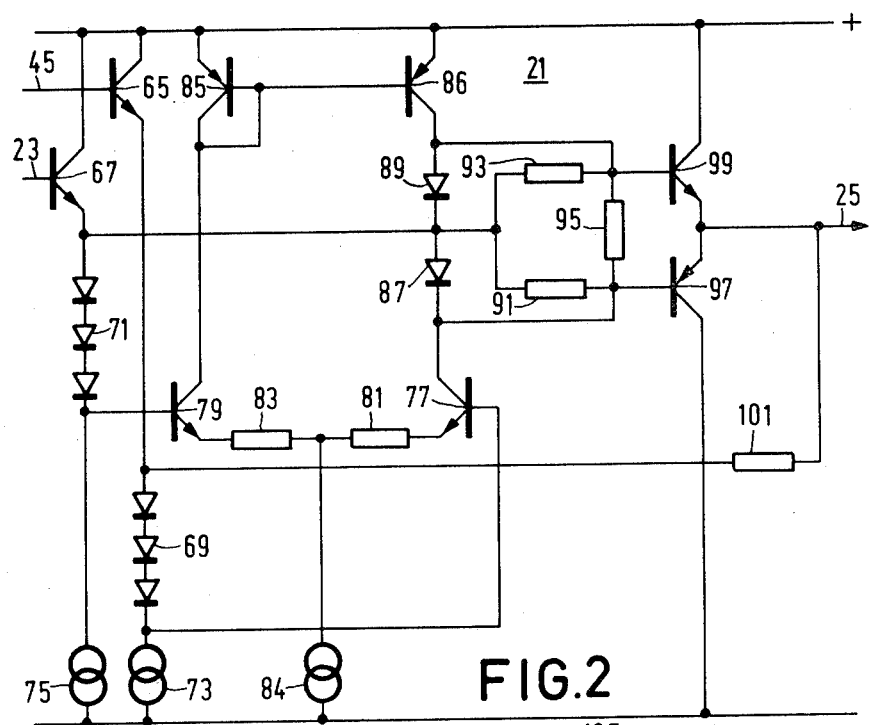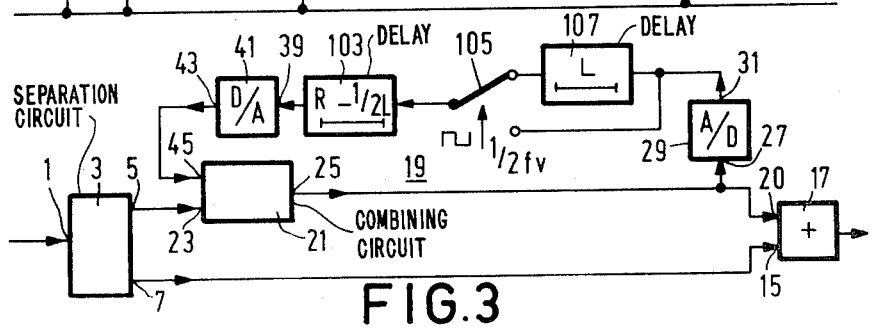

VIDEO SIGNAL PROCESSING CIRCUIT FOR NOISE REDUCTION

BACKGROUND OF THE INVENTION

The invention relates to a video signal processing circuit comprising a separation circuit for obtaining separately the high-frequency and the low-frequency video signal component from an input video signal to be processed and a noise suppression circuit which operates on one of the separated video signal components.

U.S. Pat. No. 3,715,477 discloses a video signal processing circuit of the above-mentioned type for use in television cameras in which the noise suppression circuit operates on the high-frequency video signal component and in which high-frequency video signals of a small amplitude are suppressed in a simple amplitude selection circuit.

SUMMARY OF THE INVENTION

The invention has for its object to provide a circuit which is particularly suitable for use with television receivers.

According to the invention, a video signal processing circuit of the type described in the opening paragraph is therefore characterized in that the noise suppression circuit is a circuit which operates on the low-frequency video signal component and comprises a comb filter having a delay circuit and a combining circuit, an output signal of said delay circuit being added to said low frequency video signal component in said combining circuit.

Applicants have found that on reproduction, low-frequency noise components are the most annoying and can not substantially be suppressed with simple amplitude selection circuits.

It should be noted that the use of comb filters having delay circuits in noise suppression circuits is known per se from U.S. Pat. No. 4,058,836. However, by having the noise suppression, in accordance with the invention, operate only on the low-frequency component of the video signal, a considerable savings in the number of delay circuit elements can be obtained, if so desired, which may be of special importance for use in television receivers.

DESCRIPTION OF THE DRAWINGS

Embodiments of the invention will now be further explained with reference to the accompanying drawings.

In the drawings:

FIG. 1 illustrates by means of a block schematic circuit diagram an embodiment of a video signal processing circuit according to the invention, FIG. 2 illustrates by means of a circuit diagram a possible embodiment of a combining circuit for use in a video signal processing circuit of the invention, FIG. 3 illustrates by means of a block schematic circuit diagram second embodiment of a video signal processing circuit according to the invention.

DESCRIPTION OF THE PREFERRED EMBODIMENTS

Figure 4:
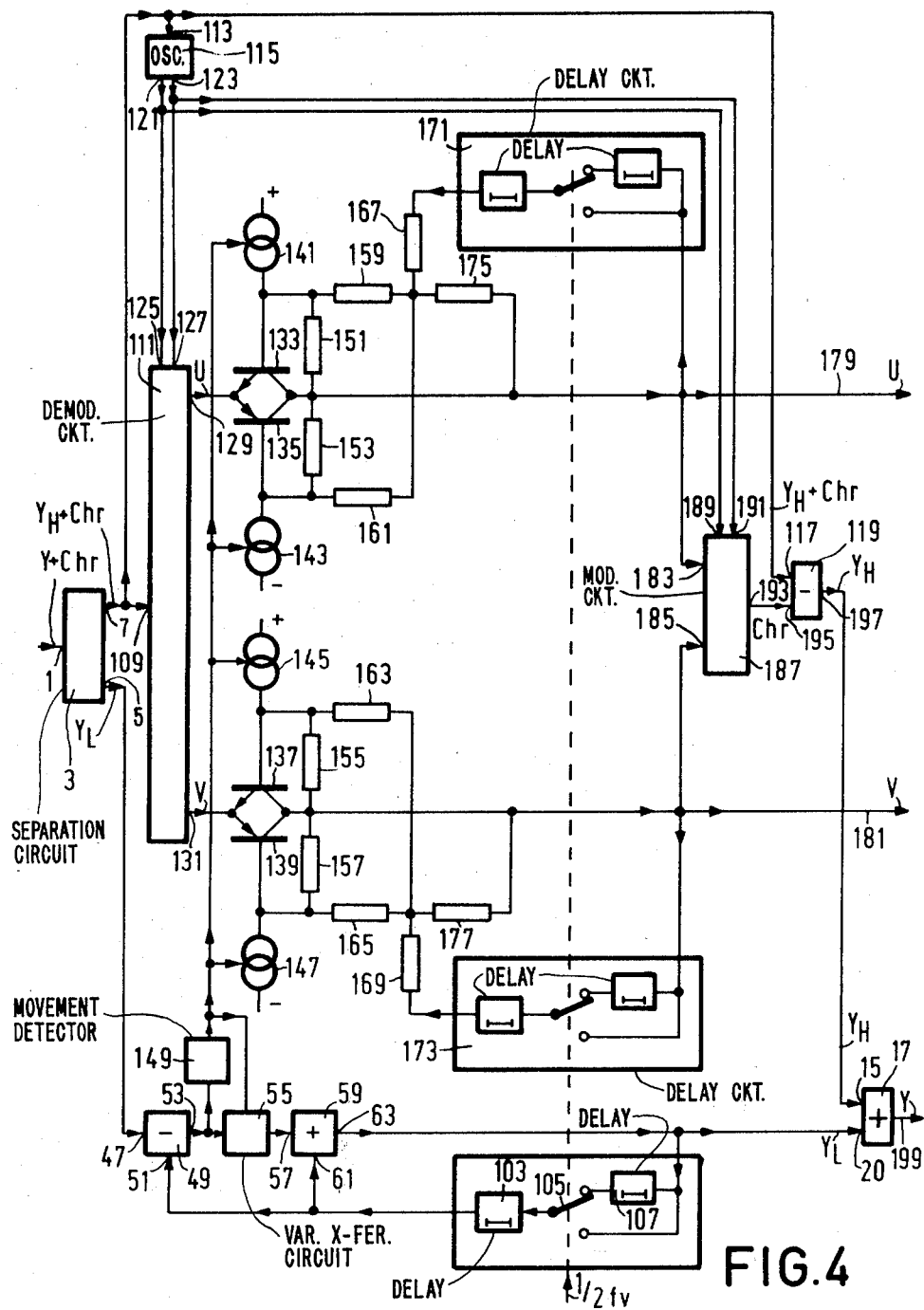
FIG. 4 illustrates by means of a block schematic circuit diagram third embodiment a video signal processing circuit according to the invention.

In FIG. 1 there is applied to an input 1 of a separation circuit 3 a video signal which is divided by the separation circuit 3 into a low-frequency component, which is supplied from an output 5 and into a high-frequency component, which is supplied from an output 7. For this purpose, a low-pass filter 9 is arranged in the separation circuit 3 between the input 1 and the output 5 and a delay line 11 which passes the entire bandwidth of the video signal and which has a time delay C which is the same as the time delay of the low-pass filter 9, and a subtracting circuit 13 in which an output signal from the low-pass filter is subtracted from the delayed video signal arranged between the input 1 and the output 7. As a result thereof, only the high-frequency component of the video signal is left at the output 7. For a monochrome signal the cut-off frequency of the low-pass filter is preferably taken approximately equal to 1 MHz and for a color difference signal, equal to approximately 500 kHz.

The high-frequency component obtained from the output 7 is directly applied to an input 15 of an adder circuit 17 and the low-frequency component, coming from the output 5, is applied to a further input 20 of the adder circuit 17 via a noise suppression circuit 19, which is connected as a comb filter.

The noise suppression circuit 19 is formed by a combining circuit 21, which has an input 23 connected to the output 5 of the separation circuit 3 and an output 25 to the input 20 of the adder circuit 17 and to an input 27 of an analog-to-digital converter 29. An output 31 of this converter 29 is connected to an input 33 of a digital delay circuit 35, an output 37 of which is connected to an input 39 of a digital-to-analog converter 41, an output 43 of which is connected to a further input 45 of the combining circuit 21. For a proper noise suppression the delay circuit 35 should have a delay of one picture period.

In the combining circuit 21, the input 23 is connected to an input 47 of a subtracting circuit 49 and the input 45 to a further input 51 of the subtracting circuit 49. Via a variable transfer circuit 55, an output 53 of the subtracting circuit is connected to an input 57 of an adder circuit 59, a further input 61 of which is connected to the input 45 of the combining circuit 21 and an output 63 to the output 25 of the combining circuit 21.

The variable transfer circuit 55 may be a circuit the transfer factor of which depends on a voltage which is derived from the video signal by means of, for example, a movement detector or a non-linear circuit. It is alternatively possible to implement this variable transfer circuit as a non-linear circuit so that its transfer factor depends on the amplitude of its input signal.

The operation of the noise suppression circuit is further described in U.S. Pat. No. 4,058,836, which is incorporated in this description by reference.

An advantage of the circuit of FIG. 1 is that the combining circuit 21 is included in the analog signal processing portion; only the delay circuit 35 processes digital signals. The separation circuit 3 may, consequently, be of a simple construction. Signal deviations owing to imperfections in the filter 9 are applied in the opposite sense to the adder circuit 17 as a result of the complementary construction of the separation circuit 3, so that they cancel each other in this adder circuit. As no sampling action is performed in the signal path from the output 5 of the separation circuit 3 to the adder circuit 17 there is no risk of unwanted frequency spectra overlaps (aliasing). It appears that any occurrence of aliasing in the converter 29 is not annoying, as they only occur at sudden signal transients and are not transferred by the combining circuit 21. In addition, the combining circuit 21 can be easily realized in analog form. FIG. 2 shows an embodiment of such an analog construction.

It is, however, of course possible to construct also the combining circuit 21 and the adder circuit 17 in a digital form when the necessary measures to prevent or suppress annoying phenomena are taken.

In this embodiment the noise suppression circuit 19 is provided as a recursive circuit, but if so desired a transversal circuit may be used.

In FIG. 2, corresponding components have been given the same reference numerals as in FIG. 1. The inputs 45 and 23 are connected to the bases of emitter followers 65 and 67, respectively, which include in their emitter circuits series arrangement of three diodes 69 and 71, respectively, and current sources 73 and 75, respectively. The diodes 69 and 71, respectively, are used to produce a d.c. level shift. The signals at the inputs 45 and 23 are applied by the emitter followers 65, 67 to the connections between the current sources 73, 75 and the diodes 69, 71, which are connected to the bases of transistors 77 and 79, respectively, the emitters of these transistors being connected to a current source 84 via respective resistors 81 and 83. The collector of the transistor 79 is connected to a transistor 85 which is connected as a diode, this transistor 85 being arranged in parallel with the base-emitter path of a transistor 86 and forms a current mirror circuit therewith.

The collectors of the transistors 86 and 77 are connected by a series arrangement of two diodes 87 and 89, the junction of which is connected to the emitter of the transistor 67, to which junction there are further connected two resistors 91, 93, whose other ends are connected to the ends of a resistor 95.

The voltages at the connections between the resistors 93, 95 and 91, 95, respectively, are applied, via emitter-followers 97 and 99, respectively, to the output 25 with a transfer factor which is determined by the bias voltages of the emitter-followers. These bias voltages are produced by the diodes 87 and 98. A resistor 101, which is arranged between the emitter of the transistor 65 and the output 25, forms, in conjunction with the emitter leads of the transistors 97, 99, connected to the output 25, an adder circuit which is comparable with the adder circuit 59 of FIG. 1.

The transistors 97, 99 form a non-linear subtracting circuit which is comparable with a combination of the circuits 49 and 55 of FIG. 1. The difference between the voltages at the junction of the resistors 91 and 93 and at the emitters of the transistors 97, 99 is transmitted with an attenuation, which depends on the difference between the signal amplitudes at the inputs 23 and 45, by the transistors 97 and 99 and is added to the voltage at the lead from the emitter of transistor 65 to the resistor 101.

When there is a large difference between the voltages at the inputs 23 and 45, this difference being produced when there is no correlation between these signals, a high voltage is generated across one of the diodes 87 or 89 by the input signal-controlled transistors 77, 86. One of the emitter-followers 97, 99 then conducts without attenuation and the voltage at the output 25 is determined almost exclusively by the voltage at the emitter of the transistor 67 and, consequently, at the input 23.

If the difference between the voltages at the inputs 23 and 45 is small and there is consequently a high degree of correlation between those signals, then the bias voltage for the emitter-followers 97, 99, generated across one of the diodes 87, 89 becomes much lower, causing its transfer factor to decrease so that the contribution of the signal at the emitter of the transistor 65 to the signal at the output 25 becomes higher. Then a sum of the signals at the inputs 23 and 45 is produced at the output 25.

If so desired, the transfer characteristic of the emitter followers 97, 99 may be still further influenced by a control of the current source 84, for example by means of a noise-amplitude-dependent signal.

In FIG. 3 the same reference numerals have been used for corresponding components present in FIG. 1. In FIG. 3 there is arranged between the output 31 of the analog-to-digital converter 29 and the input 39 of the analog-to-digital converter 41, a delay circuit having a series arrangement of a delay line 103, which has a time delay of one field period minus half a line period $(R - \frac{1}{2}L)$ and a change-over switch 105, which assumes from field to field a different position and which during one field makes a direct connection of the delay line 103 to the output 31 of the analog-to-digital converter 29 and makes this connection during the other field via a delay line 107 with a delay of one line period (L). With such a delay circuit, it is possible to obtain a noise suppression which is almost equal to the noise suppression obtainable with a picture delay, while yet no annoying noise patterns occur as is the case when a field delay is used. This circuit results in a further savings in elements, so that it is still better suitable for use in television receivers.

Circuits in accordance with the invention are of course not only suitable for use in television receivers but they may also be employed in, for example, other video signal display devices such as, for example, in display devices for video recorders or display devices for video signals which were obtained by means of ultra-sound pick-up devices.

When a digital non-linear circuit 55 is used, it may, for example, be in the form of a programmable read-only memory (PROM).

In FIG. 4 corresponding components have been given the same reference numerals as in the preceding FIGS. 1 and 3. For the description of these components reference is made to the description of these preceding Figures.

In addition to noise suppression in the low-frequency portion $Y_L$ of a video signal Y, noise suppression is effected in a chrominance signal CHR which is also applied to the input 1. This chrominance signal CHR comprises two color difference signal components U and V, modulated on a sub-carrier.

Not only the high-frequency component $Y_H$ of the video signal but also the chrominance signal CHR is produced at the output 7 of the separation circuit 3. The total signal $Y_H + CHR$ at the output 7 of the separation circuit 3 is applied to an input 109 of a demodulation circuit 111, to an input 113 of an oscillator circuit 115 and to an input 117 of a subtracting circuit 119.

With the aid of a color synchronizing signal present in the signal applied to its input 113, the oscillator circuit 115 generates two reference signals whose phases are shifted 90° relative to each other, these reference signals being produced at outputs 121 and 123, respectively, of the oscillator circuit 115 and applied to respective inputs 125 and 127 of the demodulation circuit 111. By synchronous demodulation of the chrominance signal with the aid of these reference signals, the color difference signal U is produced at an output 129 of the demodulation circuit 111 and the color difference signal V at an output 131.

The color difference signals U and V, respectively, are applied to the emitters of two sets of complementary pairs of transistors 133, 135 and 137, 139, respectively, the bases of which are supplied from two sets of current sources 141, 143 and 145, 147, respectively. These current sources 141, 143, 145, 147 are controlled by a movement detector 149, an input of which is connected to the output 53 of the subtracting circuit 49. This movement detector 149 also controls the attenuation of the attenuator 55 in the noise suppression circuit 19 for the low-frequency portion $Y_L$ of the video signal.

The collectors of the two sets of complementary pairs of transistors 133, 135 and 137, 139, respectively, are connected to the center taps of voltage dividers 151, 153 and 155, 157, respectively, coupled between the respective bases thereof. The center taps of further voltage dividers 159, 161 and 163, 165, respectively, also coupled between said respective bases are connected via resistors 167 and 169, respectively to output of delay circuits 171 and 173, respectively, the delays of which are equal to the delay produced by the delay circuit formed by the delay line 103, the change-over switch 105 and the delay line 107 in the noise suppression circuit 19 for the low-frequency portion $Y_L$ of the video signal. In one field this delay is a field period minus half a line period and in the next field a field period plus half a line period, but it may, for example, also be made equal to a picture period.

The inputs of the delay circuits 171 and 173, respectively, are connected to the interconnected collectors of the transistors 133, 135 and 137, 139, respectively, and, via resistors 175 and 177, respectively to the centre taps of the voltage dividers 159, 161 and 163, 165, respectively.

The transistors 133, 135 and 137, 139, respectively operate as non-linear circuits for the difference signals produced between the bases and the emitters thereof, respectively, in response to the signals coming from the outputs 129 and 131, respectively, of thwe demodulation circuit 111 and the signals coming from the outputs of the delay circuits 171 and 173, respectively.

Added to the resultant difference signals at the collectors of the transistors 133, 135 and 137, 139, respectively, are the output signals of the delay circuits 171 and 173. A small difference signal amplitude is transmitted highly attenuated by the transistors 133, 135 and 137, 139, respectively, and a large difference signal amplitude is transmitted with an attenuation near unity. The amplitude of the signal at the collectors at which said attenuation becomes substantially equal to unity depends on the current produced by the current sources 141, 143 and 145, 147, respectively.

The interconnected collectors of the transistors 133, 135 and 137, 139, respectively, are further connected to outputs 179 and 181, respectively, from which color difference signals U and V, respectively, are taken in which noise suppression has been effected and to inputs 183 and 185, respectively, of a modulation circuit 187, further inputs 189, 191 of which are connected to the outputs 121 and 123, respectively, of the oscillator circuit 115.

As a result thereof, a quadrature-modulated chrominance signal CHR, in which the noise has been suppressed, is produced at an output 193 of the modulation circuit 187. This signal is applied to a further input 195 of the subtracting circuit 119 and subtracted therein from the signal $Y_H$+CHR, so that only the signal $Y_H$ appears at an output 197 thereof.

Said signal $Y_H$ is applied to the input 15 of the adder circuit 17 and added therein to the signal $Y_L$ which is applied to the added circuit input 20, so that the signal $Y = Y_L + Y_H$ is produced at an output 199 of the adder circuit 17.

In this signal Y at the output 199 of the adder circuit 17, the noise is suppressed in the low-frequency portion and the cross-talk of chrominance to luminance (cross-luminance) has been suppressed in the high-frequency portion.

As the movement detector 149 also affects the non-linear circuits 133, 135 and 137, 139 in the U and V signal paths, not only the noise is suppressed at pictures in which no movement occurs but also the cross-talk from luminance to chrominance (cross-color) is suppressed in the U and V signal paths. This is done independently of the use of the above-mentioned cross-luminance suppression.

Although, if so desired, a picture memory may be employed in the delay circuits 171, 173 and 103, 105, 107, the use of a field memory, as shown in the Figure, results in a more rapid suppression of cross-color.

Although in this embodiment a circuit for processing a PAL-signal is described, such a circuit may alternatively be used for an N.T.S.C.-signal. In the circuit for processing the PAL-signal, averaging of the U and V signals may be effected by the noise suppression circuits.

If so desired one noise suppression circuit for the U and V signals will do if these signals are passed in time-division multiplex through the noise suppression circuit. This is particularly advantageous when the noise suppression circuit is suitable for digital signal processing.

In the above-described embodiments analog circuits were provided for the linear circuit and the noise suppression circuits. It is of course alternatively possible to use suitably adapted digital non-linear circuits which may be formed by, for example, a programmable read-only memory (PROM).

What is claimed is:

1. A video signal processing circuit comprising a separation circuit having two outputs for providing separately a high-frequency and a low-frequency signal component from an input video signal to be processed and a noise suppression circuit which operates on one of the separated video signal components received from said separation circuit, characterized in that the noise suppression circuit is coupled to the low-frequency signal component output of said separation circuit and comprises a comb filter having a delay circuit and a combining circuit, an output signal of said delay circuit being added to said low-frequency video signal component in said combining circuit.

2. A video signal processing circuit as claimed in claim 1, characterized in that, for processing video signals containing color information for a color picture to be displayed as a result of the video signal, said video signal processing circuit further comprises means, coupled to the high-frequency signal component output of said separation circuit, for providing the color information contained in the high-frequency signal component of the video signal, and a further noise suppression circuit, having a variable transfer circuit therein, coupled to the output of said color information means, and said noise suppression circuit, coupled to the low-frequency signal component output of said separation circuit, further comprises a movement detector, an output of which is coupled to said variable transfer circuit in said further noise suppression circuit for controlling the transfer factor thereof.

3. A video signal processing circuit as claimed in claim 2, characterized in that it further comprises means, also coupled to the high-frequency signal component output of said separation circuit, for suppressing said color information in the high-frequency component of the video signal by means of the noise suppressed color information from said further noise suppression circuit.

4. A video signal processing circuit as claimed in claim 1 for an interlaced television system, characterized in that the delay circuit of the comb filter has a switchable delay time which delay time during alternate field scanning periods, is a field period plus half a line period and during intervening field scaning periods, is a field period minus half a line period.

5. A video signal processing circuit as claimed in claim 1, characterized in that the separation circuit and the combining circuit are in the form of analog circuits and the delay circuit is in the form of a digital circuit.

* * * * *